(12) United States Patent
Scascighini et al.

(10) Patent No.: US 10,657,602 B2
(45) Date of Patent: May 19, 2020

(54) DYNAMICALLY TRIGGERED INSURANCE SYSTEM BASED ON A FLOATING RECOVERABLE BASIS AND CORRESPONDING METHOD

(71) Applicant: Swiss Reinsurance Company Ltd., Zurich (CH)

(72) Inventors: Andrea Scascighini, Pfaeffikon (CH); Claudio Troehler, Zurich (CH); Daniel Trzesniak, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 309 days.

(21) Appl. No.: 15/699,439

(22) Filed: Sep. 8, 2017

(65) Prior Publication Data
US 2018/0047109 A1    Feb. 15, 2018

Related U.S. Application Data

(63) Continuation of application No. PCT/EP2016/058720, filed on Apr. 20, 2016.

(51) Int. Cl.
*G06Q 40/08*     (2012.01)
*G06Q 10/06*     (2012.01)

(52) U.S. Cl.
CPC ......... *G06Q 40/08* (2013.01); *G06Q 10/0635* (2013.01)

(58) Field of Classification Search
USPC .......................................................... 705/4
See application file for complete search history.

(56) References Cited

U.S. PATENT DOCUMENTS

| | | | |
|---|---|---|---|
| 2010/0036684 A1* | 2/2010 | McNamee | G06Q 40/08 705/4 |
| 2012/0271658 A1* | 10/2012 | Sloan, III | G06Q 40/08 705/4 |

(Continued)

FOREIGN PATENT DOCUMENTS

WO    WO 2015/144241 A1    10/2015

OTHER PUBLICATIONS

Forecasting Expectations of Insured Depository Default and Catastrophic Losses David Andrew D'Zmura Feb. 24, 1998 (Year: 1998).*

(Continued)

*Primary Examiner* — William E Rankins
(74) *Attorney, Agent, or Firm* — Oblon, McClelland, Maier & Neustadt, L.L.P.

(57) ABSTRACT

Proposed are a system and a method for a dynamically triggered risk-transfer system based on an automatically steered, floating recoverable basis. The system triggers coupled first and second insurance systems providing self-sufficient risk protection for a variable number of defined risk exposure components. In the case of the occurrence of one of the defined risk events, the occurred loss is automatically covered by the first insurance system. A first trigger module triggers a variable loss ratio parameter via an alterable loss ratio threshold value, wherein the trigger system comprises an aggregation module for automatically aggregating captured loss parameters of the measured occurrence of risk events over all risk exposure components within a predefined time period by incrementing an associated stored aggregated loss parameter and for automatically aggregating the received and stored first payment parameters over all risk exposure components within the predefined time period by incrementing an associated stored, aggregated payment parameter, and wherein the variable loss ratio (Continued)

parameter is generated dynamically based upon the ratio of the aggregated loss parameter and the aggregated payment parameter. Triggering the variable loss ratio parameter exceeding said loss ratio threshold value, a second trigger module of the trigger system is activated, wherein a floating activation value is dynamically set to the value of the variable loss ratio parameter subject to the aggregated loss parameter. The floating activation value is triggered by means of an adjustable minimum activation threshold trigger. If said floating activation value exceeding the minimum activation threshold trigger is triggered, the second insurance system is automatically activated by transferring activation signaling by means of the system to the second insurance system covering, upon activation, said adopted portion of risk exposures accumulated by the first insurance system.

44 Claims, 4 Drawing Sheets

(56) References Cited

U.S. PATENT DOCUMENTS

| 2014/0039936 | A1* | 2/2014 | Da Victoria Lobo | ........................ G06Q 40/08 705/4 |
| 2015/0112734 | A1* | 4/2015 | Knaust | .................. G06Q 50/22 705/4 |
| 2015/0112735 | A1* | 4/2015 | Knaust | .................. G16H 50/30 705/4 |
| 2018/0114272 | A1* | 4/2018 | Reimann | ................ G06N 5/022 |

OTHER PUBLICATIONS

PCT International Search Report issued in International Application No. PCT/EP2016/058720, dated Apr. 20, 2016 (4 pages).
Written Opinion of the International Searching Authority issued in International Application No. PCT/EP2016/058720, dated Apr. 20, 2016 (4 pages).

* cited by examiner

DYNAMICALLY TRIGGERED INSURANCE SYSTEM BASED ON A FLOATING RECOVERABLE BASIS AND CORRESPONDING METHOD

FIELD OF THE INVENTION

The present invention relates to a dynamically triggered, multi-tier risk-transfer system, at least comprising a first and second tier insurance system, in particular to a dynamically triggered, multi-tier risk-transfer system based on an automatically steered, floating recoverable basis, wherein the system triggers, signals, and mutually and automatically activates coupled first and second insurance systems (risk-transfer tiers) providing self-sufficient risk protection for a variable number of defined risk exposure components by means of associated first and second resource pooling systems. More particularly, the invention relates to an event-driven, dynamically adapted double trigger structure adapted based on an automatically steered, floating recoverable basis for the two coupled, operated resource pooling systems in order to provide risk protection with regard to the pooled risk exposure components by means of the two complementary or supplementary activated resource pooling systems associated with the inventive system.

BACKGROUND OF THE INVENTION

Unexpected losses are one of the biggest shortcomings of traditional risk transfer systems. Because traditional risk management and transfer systems are necessarily driven by statistical assessment or by prior history measuring methods, they are generally limited to dealing with measured or otherwise captured events that vary within parameters that have already been captured and experienced. One of the problems with this is that most large losses are caused by events that fall outside the bounds of normal experience, i.e., hundred-year floods and once-in-a-lifetime events, or casualties such as asbestos or lead poisoning. However, smaller variations may also be corruptive to the operation of automated risk transfer and/or management systems, since the pooled resources covering transferred risks typically need to be optimized. For example, if the likelihood of the occurrence of a risk event is so high, or the costs of the event so large, or the pooled resources are not properly minimized related to the transferred risks, the resulting resources to be pooled are large relative to the amount of protection achieved, i.e., risk transferred. It is then not likely that a risk-exposed element will transfer its risk to the corresponding risk-transfer system. For risk-transfer systems, the so-called loss ratio provides a measure for the operational stability of the system. The loss ratio is the ratio of total losses incurred, paid, and reserved in claims plus adjustment expenses due to maintaining the system, divided by the total pooled resources, e.g., premiums. Loss ratios for property and casualty insurance systems, e.g., motor car insurance, typically range from 40% to 60%. Such systems are collecting more premiums than the amount of resources transferred to cover losses. In contrast, risk-transfer systems that consistently experience high loss ratios will not be able to maintain long-term operation. In the prior art, the terms "permissible", "target", "balance point", or "expected" loss ratio are used interchangeably to refer to the loss ratio necessary to fulfill the system's operational goal to maintain its operation.

Automated risk transfer systems and appropriate techniques are vastly employed and implemented in many prior art risk transfer systems and insurance technology systems. Thus, in the last decade, apart from the traditional channels of financing risks, alternative routes based on automated, self-sufficient risk transfer systems and/or insurance systems have been developed. Self-sufficiency or self-containment in the context of this document is directed to systems capable of automated, long-term operation without operational interruption due to unbalanced resources. Thus, self-sufficiency defines an operating state not requiring any aid, support, or interaction, for keeping up the operation, i.e., the system is able to provide for survival of its operation independent of any human interaction. Therefore, it is a type of operational autonomy of an automated system. On an operational automation scale, a system with totally self-sufficient operation does not need manual external adjustments for its operation to initiate or uphold its operation, i.e., it is able to work in operational autonomy. The present invention extends this technology to a multi-tier risk transfer structure with mutually and dynamically tuned triggers by interaction with externally measured or otherwise externally captured environmental parameters, thereby reinforcing the importance of developing automated systems allowing a self-sufficient operation. Tuned means that the trigger parameters of the two trigger layers are dynamically adapted and transferred between the triggers. As described, the layered trigger structure tied to externally occurring conditions and events allows for a new form of maintaining and ensuring long-term operation of automated, autonomous operable risk-transfer systems, and further optimizing the operation and pooled resources of the systems.

The automation of modern insurance systems has been largely concentrated on the problem of how risk-averse components can beneficially and automatically transfer their risks to an automated risk-management system. Since the underlying problem has a statistical nature, the likelihood of a risk transfer system being triggered by a risk event comes close to certainty over an appropriately long time horizon, and the operation of the system thus cannot be steered by the condition of measuring the occurrence of a risk event, but rather when such a risk event is measured. An optimized operation of a risk transfer or insurance system depends on its structure and tuning based on the ability to forecast future risk event measurements. The level of uncertainty is high, since it affects the risk transfer structure and operation of the system. To relieve this problem, one of the characteristics of risk transfer systems is the pooling of risks and risk transfers. In the prior art, the pooling of risk transfers can typically involve the grouping, selecting and filtering of various risk exposures, so that the law of large numbers can operate to provide a more accurate prediction of future losses. From a technical point of view, if the losses associated with risk transfer are more predictable, the operation and management of the actual risk transfers can be optimized. Additional risk transfer is another important element, where first risk transfer or insurance systems can optimize or stabilize operation by partially shifting pooled risks to a third system, as a second insurance system. In the prior art, automated risk transfer systems have been used for quite some time as a technical tool to manage the risk of uncertain losses, in particular to keep up the operation of functional, technical or business units. These days, significant risk exposure is associated with many aspects in the life and non-life sectors. Risk-exposed units, such as any kinds of objects, individuals, corporate bodies and/or legal entities, are necessarily confronted with many forms of active and passive risk management to hedge and protect against the risk of certain losses and events. The prior art addresses such risks of loss, for example, based on transferring and pooling the risk of loss from a plurality of risk-exposed entities to a dedicated pooling entity. In essence, this can be executed by effectively allocating the risk of loss to this pooling unit or entity in that the resources of associated units, which are exposed to a certain risk, are pooled. If one of the units is hit by an event that is linked to a transferred risk, the pooling entity directly intercepts the loss or damage caused by the event by transferring resources from the pooled resources to the affected unit. Resource pooling can be achieved by exchanging predefined quantities of resources with the resource-pooling system; e.g., payments or premiums that are to be paid for the transfer of the risk. This means that predefined resource quantities are exchanged for the other unit, thereby assuming the risk of loss. As described above, insurance systems can use automated, electronic-based resource pooling systems to pool the resources and risks of associated risk-exposed components. As mentioned above, to avoid operational instabilities, such resource pooling systems of an insurance system are often coupled to one or more subsequent risk-transfer systems in order to redistribute parts of their pooled risks. Correspondingly, a loss to be covered can be portioned or segmented by those coupled insurance systems.

Typically, risk associated with risk-exposed components can be broadly divided into three categories, i.e., expected risks, unexpected risks, and catastrophic risks. The systems covering expected risks can simply be based on setting an appropriate threshold value for a resource retention, which should equalize the quantity of pooled risks. Unexpected risks, e.g., operational risks, risk based on an excessively low selected retention level, or risks occurring out of IBNR losses, i.e., incurred but not [yet] reported, cover prospective as well as retrospective risks, including so-called adverse development cover (ADC). The last type of possible losses concerning catastrophic risks are technically even more difficult to capture, since they do not obey the law of large numbers. Traditional prior art systems are directed to catastrophic derivatives, securitization, and contingency financing, in particular to transfer risks by appropriate structures to the capital market. Due to the different characteristics of the risks to be captured, the prior art systems fail to cover different risk transfers from different categories, in particular since the operation of prior art systems needs to be specifically adapted and optimized to cope with specific risk characteristics. Thus, in the prior art, each specific type of risk event needs to be covered by a different risk transfer system or mechanism, which makes the operation and optimization of the risk cover difficult and confusing for risk-exposed components. The goal of minimizing the total risk exposure of a risk-exposed component and/or an insurance system under different boundary criteria, such as value at risk or conditional value at risk criteria, i.e., by finding the optimal balance between the benefit reducing the risk by purchasing reinsurance shares and the cost premiums of the redistributed insurance risk shares, is difficult to achieve. Therefore, one of the objects of the present invention addresses the technical problem of coupling two automated resource pooling systems with the goal of pooling the risk exposure of associated components and seeking better and more effective technical implementations based on an appropriate risk transfer and dynamic trigger structure covering the different aforementioned risk categories, i.e., that is broader in its applicable scope and easier to be placed.

The prior art specifies a plurality of systems addressing the above-mentioned problem. For example, US 2004/0236698 A1 describes a system for automated risk management trade between two coupled systems, in particular, an insurance system and a reinsurance system. This system provides for the transfer of premiums and loss payments directly between the risk-pooling systems. Further, the system allows for interactions between the two coupled systems, which allows for decision-making functions concerning reinsurance products. Another example of the known prior art in the field of automated risk transfer systems is US 2011/0112870 A1. US 2011/0112870 A1 discloses a system for determining a percentage for assigning, i.e., transferring, related risk in an insurance pool, wherein the transferred risks are shared via a secondary resource pooling system that is based on predefined transfer-specific conditions of a reinsurance contract. The system mainly allows for automatically providing information regarding losses, which is transferred to the captive resource pooling system in the insurer's system and the reinsurer's system. However, US 2011/0112870 A1 does not disclose a system and technical mechanism for determining the amount of the actual risk transfer or covering different risk categories. It is worth noting that nothing in the prior art provides a system for a risk transfer structure capable of covering different categories of risks, or even capable of using the different categories of risks to balance the pooled risks.

In summary, in the prior art, existing systems, whose operations are at least partially based on risk transfer schemes or structures, come in many different forms, often with very different objectives and operational approaches. However, typically, the range of schemes or structures of the prior art systems are specific to one particular risk, risk category, locality, sector or country. Moreover, there is no system capable of providing a dynamically floating retention based on changes in losses over multiple years. Furthermore, these systems do not provide a self-sustaining interaction with the environment, and do not provide means for self-adjustment of their operation, thus do not allow for a stable long-term operation of systems. In this context, it is important to note that the limitations of the prior art risk-transfer systems previously discussed are also driven by the lack of information, this problem also extending to the risk analysis, so that they must rely completely on the information provided to them. These same limitations also extend to all known efforts to analyze and/or simulate the impact of changes in the transferred risks. However, it is impossible to forecast the impact on risks with no prior information. The lack of information also limits simulation systems, such as dynamic analysis or the like, to protect against the impact of changes in the pooled risks. Similarly, the lack of quantitative information on the impact of risks has limited the usefulness of automated risk-transfer systems.

SUMMARY OF THE INVENTION

It is one object of the present invention to provide a dynamically triggered, automated, and self-sustaining system and method for capturing the risk of risk events of a variable number of risk exposure components by providing dynamic, self-sufficient risk protection for the risk exposure components. In particular, it is an object of the present invention to extend the existing technology to a dynamically triggered and adjusted, multi-tier risk-transfer system based on a floating recoverable, thereby reinforcing the importance of developing automated systems allowing self-sufficient operation; more particularly, it is an object to provide an automated trigger mechanism and appropriate device between the two coupled risk-transfer systems offering a measurable optimization of the systems. Another object of the invention seeks to provide a way to technically capture, handle, and automate dynamically adaptable, complex risk transfer structures and trigger related operations for optimal automation of shared risks and transfer operations. Another object of the invention seeks to dynamically synchronize and adjust such operations to changing environmental or operational conditions, e.g., floating recoverable bases, based on the technical multilayered trigger structure approach. In contrast to standard practice, the resource pooling systems create a reproducible operation with a desired, technically based, repetitious accuracy that relies on technical means, process flow and process control/operation. Finally, one of the objects of the present invention addresses the technical problem of coupling two automated resource pooling systems with the goal of pooling the risk exposure of associated components and seeking better and more effective technical implementations, thereby covering different risk categories, in particular property, casualty, and natural calamity risks.

According to the present invention, these objects are in particular achieved with the features of the independent claims. In addition, further advantageous embodiments can be derived from the dependent claims and the related descriptions.

According to the present invention, the above-mentioned objects for a dynamically triggered, multi-tier risk-transfer system based on an automatically steered, floating recoverable basis, are in particular achieved in that, by means of the present invention, the technology is extended to a dynamically triggered and adjusted, multi-tier risk-transfer system based on a floating recoverable, thereby reinforcing the importance of developing automated systems allowing self-sufficient operation. In particular, the present invention is realized by means of a system, which is dynamically tuned and adapted by triggering the activation of first and second insurance systems if the Financial Year (FY) loss ratio exceeds a trigger level. The amount above the FY trigger determines and affects the maximum reinsurance recoverable, which may be subject to a defined annual aggregate limit. A Stop Loss (SL) cover is automatically provided, by means of the system, on the Accident Year (AY) via the system. The exit point of the SL threshold parameters can be defined as the captured accident year booked ultimate values. The attachment point, i.e., a floating activation value, dynamically floats based on the recoverable determined by the systems, as described above, and the activation of the second insurance system is only triggered if the attachment point is measured above the minimum attachment point. A minimum attachment point, i.e., a settable minimum activation trigger, is set at or above the plan loss level of the system in order to ensure and allow prospective accounting. In particular, the inventive system is realized by means of the present invention, in that a dynamically triggered, multi-tier risk-transfer system is based on an automatically steered, floating recoverable basis, the system triggering, signaling, and mutually activating a coupled first and second risk-transfer tier, as for example done by automated insurance systems, providing a self-sufficient risk protection for a variable number of defined risk exposure components by means of a first and second resource pooling system, wherein the risk exposure components are connected to the first resource pooling system by means of a plurality of payment transfer modules configured to receive and store first payments from the risk exposure components for the pooling of their risk exposures, wherein the first insurance system provides automated risk protection for each of the connected risk exposure components based on received and stored first payment parameters, wherein the first insurance system is connected to the second resource pooling system by means of second payment transfer modules configured to receive and store second payment parameters from the first insurance system for adopting a portion of the risk exposures accumulated by the first insurance system, and wherein, in the case of the occurrence of one of the defined risk events, the loss is automatically covered by the first insurance system, in that a trigger system of the system comprises a first trigger module triggering a variable loss ratio parameter by means of an alterable loss ratio threshold value, wherein the trigger system comprises an aggregation module for automatically aggregating captured loss parameters of the measured occurrence of risk events over all risk exposure components within a predefined time period by incrementing an associated stored aggregated loss parameter and for automatically aggregating the received and stored first payment parameters over all risk exposure components within the predefined time period by incrementing an associated stored, aggregated payment parameter, and wherein the variable loss ratio parameter is generated dynamically based on the ratio of the aggregated loss parameter and the aggregated payment parameter, in that by triggering the variable loss ratio parameter exceeding said loss ratio threshold value, a second trigger module of the trigger system is activated, wherein a floating activation value is dynamically set to the value of the variable loss ratio parameter subject to the aggregated loss parameter, and wherein the floating activation value is triggered by means of an adjustable minimum activation threshold trigger, and in that, if said floating activation value exceeding the minimum activation threshold trigger is triggered, the second insurance system is automatically activated by transferring activation signaling via the system to the second insurance system covering, upon activation, said adopted portion of risk exposures accumulated by the first insurance system. The system can for example operate on a multi-operation period basis, wherein an operation period is set to said predefined time period, wherein said adjustable minimum activation threshold trigger is set to the value of the variable activation threshold value of the first time period, and wherein the second insurance system is only activated by means of the system, if the floating activation value is triggered above the adjustable minimum activation threshold trigger. For the first operation period, i.e., where there is no preceding time period, the minimum activation threshold trigger can for example be offset, i.e., there is no triggering of the minimum activation threshold trigger, but the second insurance system is directly activated by transferring activation signaling by means of the system to the second insurance system upon triggering of the variable loss ratio parameter exceeding said loss ratio threshold value. It is worth noting that prior year developments are always required to trigger the present inventive system, but are not sufficient because the accident year loss ratio (AY LR) also needs to be above the minimum attachment point. One of the advantages of the present invention is to provide automated protection against reserve strengthening, as for example due to unexpected inflation for US Casualty, thus the present system may be operated on a Financial Year (FY) basis automatically taking the relevant operational parameters into account. Another advantage of the present system is to provide automated prospective accounting, as for example required under US GAAP. The system according to the present invention is able to (a) fulfill all regulatory and legal requirements, such as national UW and timing risk requirements, as for example given under US GAAP, and (b) be driven by future losses. Therefore, the cover basis is Accident Year. In addition, UW risk requirements are met by providing a Minimum Attachment Point in excess of the expected Loss Ratio (LR). Furthermore, the present invention allows the automatic provision of a realistic capacity balancing needs and risk appetite between first and second risk-transfer or insurance systems, for example between primary insurer and reinsurer. The present system therefore allows for providing a meaningful capacity vs. net earning of net present value given by the sum of the present values (PVs) of incoming and outgoing cash flows over a period of time, i.e., the benefit and cost cash flows. Another big advantage is that the present invention is capable of providing a dynamically floating retention based on changes in losses over multiple years. No prior art system is able to provide such a multi-year-based technical operability, in particular to keep the inventive system as a whole industrial, and functional installation in a safe and reliable operating condition, according to predefined operational requirements. This further makes it possible to provide a long-term arrangement and commitment on operating parameters by the associated and operating in-plant second insurance system, i.e., the reinsurance system. Finally, the other advantage of the present system is to allow for an indemnity cover, fulfilling this requirement on a pay-as-paid basis fulfilling the timing risk. Thus, the system allows for complete technical control of the interaction of the different system components of the system and a controlled, steered, dynamic adaption of the operation of the system by means of environmental interaction.

In one alternative embodiment, the self-sufficient risk protection for the variable number of defined risk exposure components comprises a plurality of different risk contribution portions, wherein the different risk contribution portions comprise at least defined portions of property risks and/or casualty risks and/or natural calamity risks. Alternatively, the minimum activation threshold trigger can for example be set according to a floating activation value of a time period without a measured occurrence of a natural calamity risk event. This alternative embodiment has, inter alia, the advantage that the system is only triggered under the scenario of reserve strengthening and natural catastrophe shock, but is not triggered by (i) reserve releasing and natural catastrophe shock, (ii) no reserve movements and only natural catastrophe shock, and (iii) only reserve strengthening and no natural catastrophe shock. Thus, the system is triggered by reserve strengthening and natural catastrophe shock, wherein a sub-limit can be provided for natural catastrophe shocks, and possible limitations can be set to casualty contribution based on the planned loss ratio (LR). Furthermore, the property premium can for example be set to represent only 25% of the total EPI (Estimated Premium Income) providing a limited volatility of the non-cat property. Prior year developments are always required to trigger the present inventive system, but are not sufficient because the AY LR also needs to be above the minimum attachment point.

In one alternative embodiment, the risk exposure components can, for example, be connected to the first insurance system of the present system by means of payment-transfer modules configured for receiving and storing first payment parameters from the risk exposure components for the transfer of risks associated with the risk exposure components from the risk exposure components to the first insurance system. By analogy, the first insurance system can be connected to the second insurance system of the present system by means of a payment-transfer module configured for receiving and storing second payment parameters from the first insurance system for the transfer of risks associated with pooled risk exposures of the risk exposure components from the first insurance system to the second insurance system. This alternative embodiment has, inter alia, the advantage that the flow of data and payment parameters between the system tiers and components can be completely automated, centralized, monitored, and operated by the present system, allowing for complete technical control of the interaction of the different system components of the system.

In another alternative embodiment, the switching device comprises capturing means for capturing a transfer of payment from the first insurance system to the second payment-transfer module, wherein the second layer trigger structure of the system can be activated by triggering a payment transfer matching a predefined activation threshold parameter. As a more particular alternative embodiment, a periodic payment transfer from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable via the monitoring module. As an alternative, the periodic payment transfer request can be interrupted automatically or waived by the monitoring module, when the occurrence of indicators for a risk event is triggered in the data flow pathway of a risk exposure component. These alternative embodiments have, inter alia, the advantage that the system allows for further automation of the monitoring operation, especially of its operation with regard to the pooled resources.

In another alternative embodiment, an independent verification risk event trigger of the first and/or second resource pooling system is activated in cases when the occurrence of indicators for a risk event is triggered in the data flow pathway of a risk exposure component by means of the risk event triggers, and wherein the independent verification risk event trigger additionally issues a trigger in the event of the occurrence of indicators regarding risk events in an alternative data flow pathway with independent measuring parameters from the primary data flow pathway in order to verify the occurrence of the risk event at the risk exposure component. In this alternative, the transfer of payments is only assigned to the corresponding risk exposure component if the occurrence of the risk event at the risk exposure component is verified by the independent verification risk event trigger. These alternative embodiments have, inter alia, the advantage that the operational and financial stability of the system can thus be improved. In addition, the system is rendered less vulnerable to fraud and counterfeit.

In general, the system can for example comprise capturing means that capture a payment transfer assigned to one of the two risk transfer systems, e.g., also from the first insurance system to the second payment transfer module, wherein the assigned insurance system is activated, and wherein the risk exposure of the first insurance system associated with the assigned risk transfer layer is transferred to the second insurance system. This alternative embodiment has, inter alia, the advantage that additionally, the second insurance system can be activated separately, allowing a controlled and discrete risk transfer and risk cover from the first resource pooling system to the second.

In another alternative embodiment, the first insurance system comprises an interface module for accessing and adapting the assigned operational parameters prior to the transfer of the payment parameters from the first resource pooling system to the second resource pooling system. This alternative embodiment has, inter alia, the advantage that the risk transfer structure can be dynamically adjusted and, moreover, selected and/or additionally optimized directly by the first insurance system or the second insurance system.

In still another alternative embodiment, the assembly module of the switching device comprises means for processing risk-related component data and providing data regarding the likelihood of said risk exposure for one or a plurality of the pooled risk exposure components, in particular based on risk-related component data, and wherein the receipt and preconditioned storage of payments from risk exposure components for the pooling of their risks can be dynamically determined based on the total risk and/or the likelihood of risk exposure of the pooled risk exposure components. This alternative embodiment has, inter alia, the advantage that the operation of the first and/or second resource pooling system can be adjusted dynamically to changing conditions in relation to the pooled risk, such as a change of the environmental conditions or risk distribution, or the like, of the pooled risk components. A further advantage is that the system does not require any manual adjustments, when it is operated in different environments, places or countries, because the size of the payments of the risk exposure components is directly related to the total pooled risk.

In one alternative embodiment, the system comprises means for processing risk-related component data and for providing information regarding the likelihood of said risk exposure for one or a plurality of the pooled risk exposure components, in particular based on risk-related component data, and wherein the receipt and preconditioned storage of payments from the first resource pooling system to the second resource pooling system for the transfer of its risk can be dynamically determined based on the total risk and/or the likelihood of risk exposure of the pooled risk exposure components. This alternative embodiment has, inter alia, the advantage that the operation of the first and/or second resource pooling system can be adjusted dynamically to changing conditions of the pooled risk, such as changes of the environmental conditions or risk distribution, or the like, of the pooled risk components. A further advantage is the fact that the system does not require any manual adjustments, when it is operated in different environments, places, or countries, because the size of the payments of the risk exposure components is directly related to the total pooled risk.

In one alternative embodiment, the number of pooled risk exposure components is dynamically adjusted via the first resource pooling system to a range where non-covariant, occurring risks covered by the resource pooling system affect only a relatively small proportion of the total pooled risk exposure components at any given time. Similarly, the second resource pooling system can for example dynamically adjust the number of pooled risk shares transferred from first resource pooling systems to a range where non-covariant, occurring risks covered by the second resource-pooling system affect only a relatively small proportion of the total pooled risk transfers from first resource pooling systems at any given time. This alternative has, inter alia, the advantage that the operational and financial stability of the system can be improved.

In one alternative embodiment, the risk event triggers are dynamically adjusted by means of an operating module based on time-correlated incidence data for one or a plurality of risk events. This alternative embodiment has, inter alia, the advantage that improvements in capturing risk events or avoiding the occurrence of such events, for example by improved forecasting systems, etc., can be dynamically captured by the system and dynamically affect the overall operation of the system based on the total risk of the pooled risk exposure components.

In another alternative embodiment, upon each triggering of an occurrence, where parameters indicating a risk event are measured, by means of at least one risk event trigger, a total parametric payment is allocated with the triggering, and the total allocated payment is transferrable upon a triggering of the occurrence. The predefined total payments can for example be leveled to any appropriate lump sum, such as a predefined value, or any other sum related to the total transferred risk and the amount of the periodic payments of the risk exposure component. This alternative has, inter alia, the advantage that the parametric payments or the payments of predefined amounts can rely on fixed amounts. Furthermore, the parametric payment may allow for an adjusted payment of the total sum that can for example be dependent on the stage of the occurrence of a risk event, as triggered by the system.

In addition to the system as described above, and the corresponding method, the present invention also relates to a computer program product that includes computer program code means for controlling one or more processors of the control system such that the control system performs the proposed method; additionally, it relates in particular to a computer program product that includes a computer-readable medium that contains the computer program code means for the processors.

BRIEF DESCRIPTION OF THE DRAWINGS

The present invention will be explained in more detail, by way of example, with reference to the drawings, in which.

DETAILED DESCRIPTION OF THE
PREFERRED EMBODIMENTS

Figure 1:
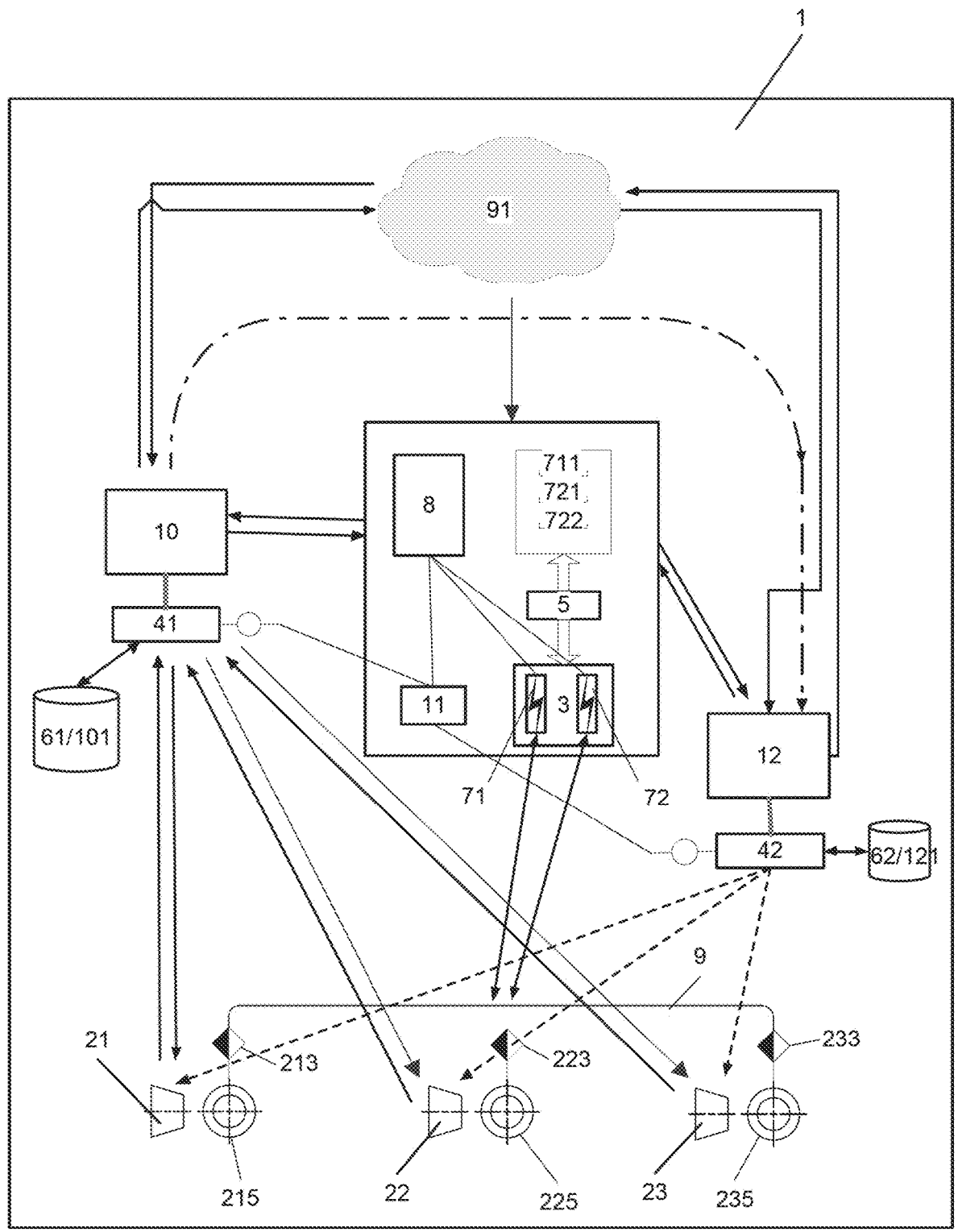
FIG. 1 shows a block diagram schematically illustrating an exemplary dynamically triggered, multi-tier risk-transfer system 1 with the two dynamic triggers 71, 72 based on an automatically steered, floating recoverable basis by providing a self-sufficient risk protection of a variable number of risk exposure components 21, 22, 23 by means of two automated resource pooling systems 101, 121.
Figure 2:
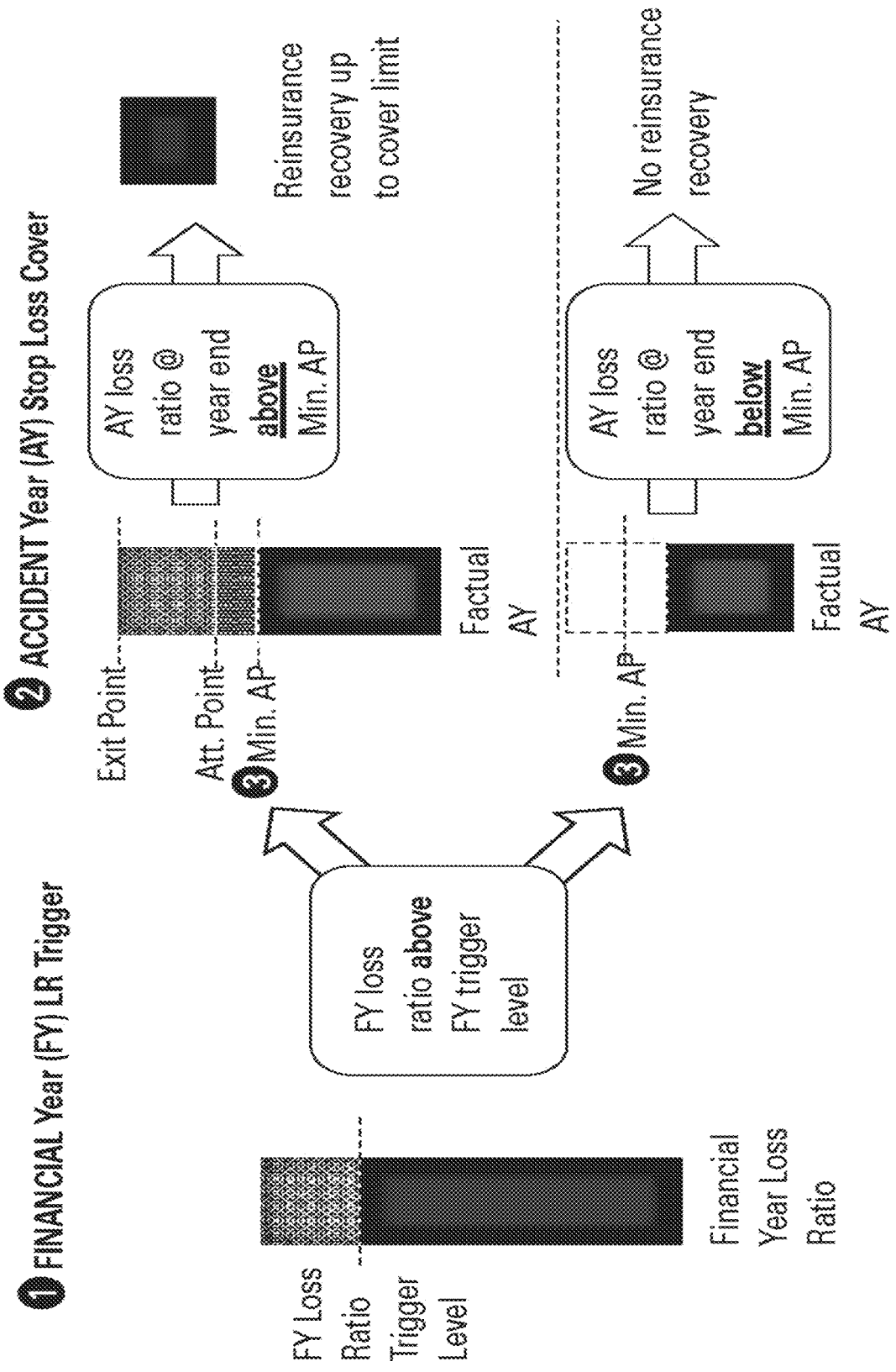
FIG. 2 shows a block diagram schematically illustrating the conceptual structure of the proposed inventive system 1, wherein the system 1 is triggered if the Financial Year (FY) loss ratio exceeds the trigger level. The amount above the FY trigger determines the maximum reinsurance recoverable, which may be subject to an Annual Aggregate Limit. The Stop Loss (SL) cover is provided on the Accident Year (AY). The exit point of the SL will be the accident year booked ultimate values. The attachment point changes based on the recoverable determined before and must be above the minimum attachment point. Said minimum attachment point (Min. AP) is defined above the expected or estimated or plan loss level of the first insurance system, which is required to allow prospective accounting.

FIG. 1 schematically illustrates an architecture for a possible implementation of an embodiment of the dynamically triggered, multi-tier risk-transfer system 1 with an event-triggered activation for complementary switching of two coupled, autonomously operated insurance systems 10, 12. The system 1 is producing a dynamically triggered and adjusted, multi-tier risk-transfer system 1 based on a floating recoverable, thereby reinforcing the importance of developing automated systems allowing self-sufficient operation. The multi-tier risk-transfer is done by the coupled first and second risk-transfer or insurance system 10, 12. The system 1 is triggered, i.e., dynamically tuned and adapted to trigger activation, if the Financial Year (FY) loss ratio exceeds a trigger level 711, referred in the following as alterable loss ratio threshold value 711. The amount above the FY trigger 711 determines and affects the maximum reinsurance recoverable, which may be subject to an annual aggregate limit. A Stop Loss (SL) cover is automatically provided on the Accident Year (AY) via the system 1. The operational exit point of the SL can be defined as the captured accident year booked ultimate values. The attachment point, which is referred to in the following as floating activation value 721 and which is set to the variable loss ratio parameter 54, floats dynamically based on the recoverable determined by the systems 1 during operation, as described below, and is only triggered if the attachment point, i.e., the floating activation value 721, is triggered to be above the minimum attachment point 722. The minimum attachment point 722, i.e., the settable minimum activation trigger 722, is set at or above the plan loss level of the system 1 in order to ensure and allow prospective accounting.

The system 1 with the first and second insurance systems 10, 12 provides self-sufficient risk protection of a variable number of risk exposure components 21, 22, 23 by means of two associated, automated resource pooling systems 101, 121 that are associated with the insurance systems. The automated resource pooling systems 101, 121 comprise the first and second payment data store 61, 62 for their operation allowing a secure payment parameter storage of stored first payment parameters 610, 611, 612 and stored second payment parameters, respectively. In FIG. 1, reference numeral 1 refers to the dynamically triggered system for providing optimized risk protection related to risk exposure components 21, 22, 23, . . . with the associated coupled resource pooling systems 101, 121. The resource pooling systems 101, 121 can for example be coupled, steered, and/or operated by means of the control device 11, provide dynamic self-sufficient risk protection and a corresponding risk protection structure for the variable number of risk exposure components 21, 22, 23, i.e., units exposed to defined risk events, wherein the occurrence of such risk events is measurable and triggerable by means of appropriate measuring devices and/or trigger modules triggering on output data in the data flow pathway, i.e., measuring parameters of the measuring and/or detection devices 31, 32, 33, 34. The dynamically triggered system 1 can for example include at least one processor and associated memory modules. The convertibly triggered system 1 can also include one or more display units and operating elements, such as a keyboard and/or graphic pointing devices, such as a computer mouse. The resource pooling systems 101 and 121 are technical devices comprising electronic means that can be used by service providers in the field of risk transfer or insurance technology for the purpose of risk transfer as it relates to the occurrence of measurable risk events 311, 321, 331, 341. The invention seeks to capture, handle, and automate, by complex technical means, related operations of the automated insurance systems 10, 12, in particular in an effort to optimize the interaction of coupled systems 10, 12, and to reduce the operational requirements. Another aspect that is addressed is finding ways to synchronize and adjust such operations related to coupling or mutually activating resource pooling systems 101, 121, which are directed at proven risk protection of risk-exposed units based on technical means. In contrast to the standard practice, the resource pooling systems 101, 121 also achieve reproducible, dynamically adjustable operations with the desired technical, repeating accuracy, because they are completely based on technical means, a process flow, and process control/operation.

The dynamically triggered, multi-tier risk-transfer system 1 is based on an automatically steered, floating recoverable basis. The system 1 triggers, signals, and mutually activates first and second risk-transfer tiers 10/12 providing self-sufficient risk protection for a variable number of defined risk exposure components 21, 22, 23 by means of a first and second resource pooling system 101/121. The first and second risk-transfer tiers 10/12 can be realized as coupled, automated first and second insurance systems 10/12. The risk exposure components 21, 22, 23, . . . are connected to the first resource pooling system 101 by means of a plurality of payment transfer modules 41 configured to receive and store 61 first payments 214, 224, 234 from the risk exposure components 21, 22, 23, . . . for the pooling of their risk exposures 50. The first insurance system 10 provides automated risk protection for each of the connected risk exposure components 21, 22, 23, . . . based on received and stored first payment parameters 610, 611, 612. The first insurance system 10 is connected to the second resource pooling system 121 by means of second payment transfer modules 42 configured to receive and store 62 second payment parameters 620, 621, 622 from the first insurance system 10 for adopting of a portion of the risk exposures 50 accumulated by the first insurance system 10. If one of defined risk events 311, 321, 331, 341 occurs, the loss is automatically covered by the first insurance system 10.

A trigger system 7 of the system 1 comprises a first trigger module 71 triggering a variable loss ratio parameter 54 by means of an alterable loss ratio threshold value 711. The trigger system 1 comprises an aggregation module 5 for automatically aggregating captured loss parameters 51 of a measured occurrence of risk events 311, 321, 331, 341 over all risk exposure components 21, 22, 23 within a predefined time period 713 by incrementing an associated stored aggregated loss parameter 52 and for automatically aggregating the received and stored first payment parameters 610, 611, 612 over all risk exposure components 21, 22, 23 within the predefined time period 713 by incrementing an associated stored, aggregated payment parameter 53. The variable loss ratio parameter 54 is generated dynamically based on the ratio of the aggregated loss parameter 52 and the aggregated payment parameter 53.

By triggering the variable loss ratio parameter 54 exceeding said loss ratio threshold value 711, a second trigger module 72 of the trigger system 7 is activated. A floating activation value 721 is dynamically set to the value of the variable loss ratio parameter 54 subject to the aggregated loss parameter 52. The floating activation value 721 is triggered by means of an adjustable minimum activation threshold trigger 722. Preferably, the system 1 operates on a multi-operation period basis 713, 714, wherein an operation period is set to said predefined time period 713, wherein said adjustable minimum activation threshold trigger 722 is set to the value of the variable activation threshold value of the first time period. The second insurance system 12 is only activated by means of the system 1, if the floating activation value 721 is triggered above the adjustable minimum activation threshold trigger 722. For the first operation period, i.e., where there is no preceding time period 713, the minimum activation threshold trigger 722, which is the minimum attachment point for the activation, can for example be offset, i.e., there is no triggering of the minimum activation threshold trigger 722, but the second insurance system 12 is directly activated by transferring activation signaling by means of the system 1 to the second insurance system 12 upon triggering of the variable loss ratio parameter 54 exceeding said loss ratio threshold value 711. Again, prior year developments are always required to trigger the present inventive system 1, but are not sufficient because the AY LR also needs to be above the minimum attachment point. In case of triggering of the floating activation value 721 exceeding the minimum activation threshold trigger 722, the second insurance system 12 is automatically activated by transferring activation signaling by means of the system 1 to the second insurance system 12 covering, upon activation, said adopted portion of risk exposures 50 accumulated by the first insurance system 10.

Figure 3:
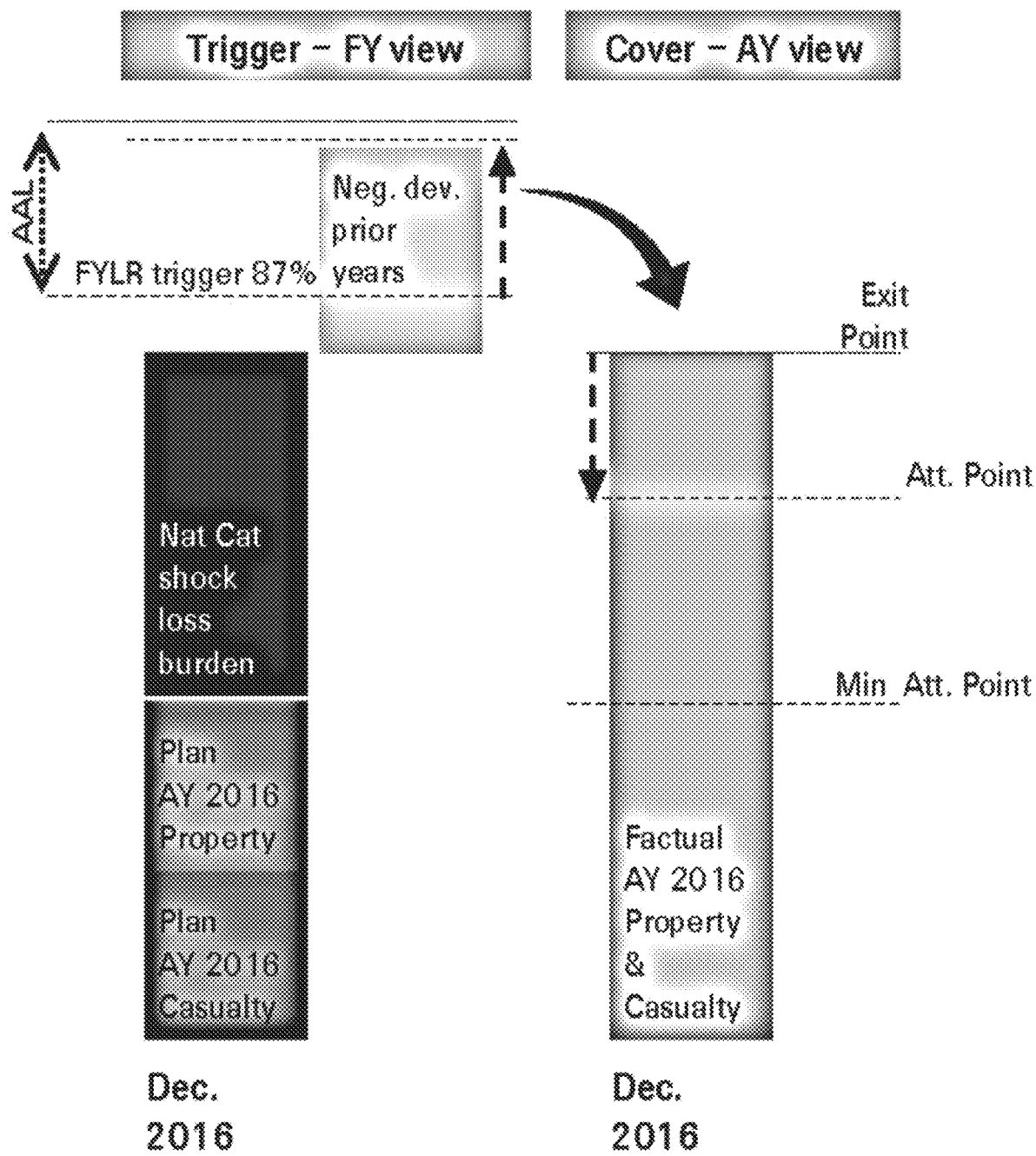
FIG. 3 shows a block diagram schematically illustrating the conceptual structure of the proposed inventive system 1, wherein the accident year stop loss is based on a financial year LR trigger. The system is only triggered under the scenario of reserve strengthening and natural catastrophic shock; however, it is not triggered (i) by reserve releasing and natural catastrophe shock, (ii) by no reserve movements and only natural catastrophe shock, and (iii) by only reserve strengthening and no natural catastrophe shock. Thus, the system 1 is triggered by reserve strengthening and natural catastrophe shock, wherein a sub-limit can be provided for natural catastrophe shocks, and possible limitations can be set to casualty contribution based on the planned loss ratio (LR). Further, the Property premium can for example be set to represent only 25% of the total EPI (Equivalent Premium Income), providing a limited volatility of the non-cat property. Prior year developments are always required to trigger the present inventive system, but are not sufficient because the AY LR also needs to be above the minimum attachment point.
Figure 4:
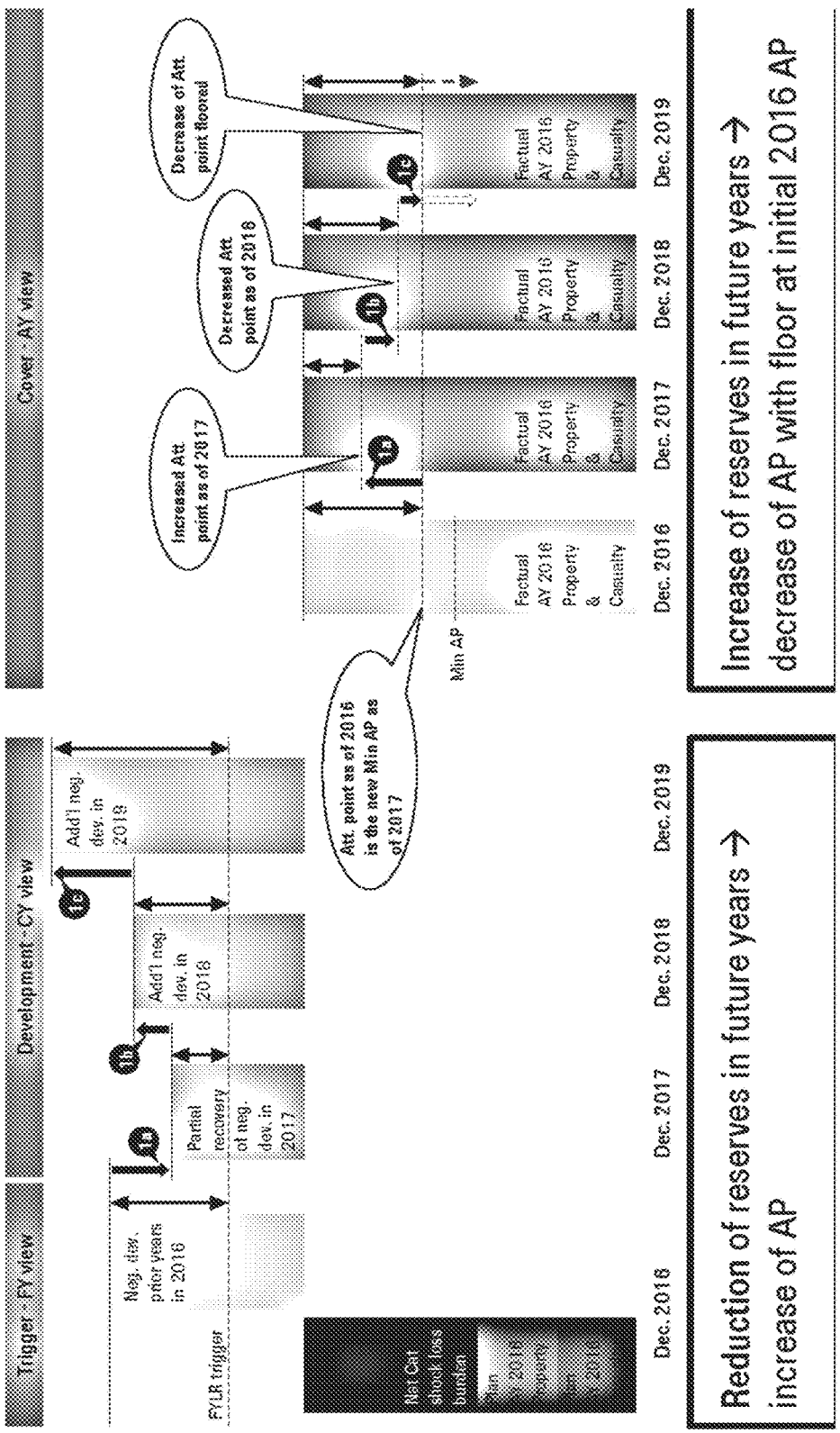
FIG. 4 shows another block diagram schematically illustrating the conceptual structure of the proposed inventive system 1, wherein the attachment point floats during the run-off depending on the reserve development. When reserves are reduced in future years, the system 1 will react by increasing the attachment point. However, when reserves increase in future years, the system 1 will react dynamically by decreasing the attachment point. In the present example, the attachment point is floored at the initial 2016 attachment point value.

As illustrated in FIG. 3, the self-sufficient risk protection for the variable number of defined risk exposure components 21, 22, 23 can for example comprise a plurality of different risk contribution portions, wherein the different risk contribution portions comprise at least defined portions of property risks 511 and/or casualty risks 512 and/or natural calamity risks 513. For this alternative embodiment, the minimum activation threshold trigger 722 can for example be set according to a floating activation value 721 of a time period without a measured occurrence of a natural calamity risk event 513.

The aggregation module 5 is capable of processing risk-related component data 211, 221, 231 and providing the likelihood 212, 222, 232 of said risk exposure for one or a plurality of the pooled risk exposure components 21, 22, 23, etc. based on the risk-related component data 211, 221, 231. The resource pooling systems 101 and 121 as well as the control device 11 can be implemented as a technical platform, which is developed and implemented to provide risk transfer through a plurality of, but at least one, payment transfer modules 41 and 42. The risk exposure components 21, 22, 23, etc. are connected to the resource pooling system 101 by means of the plurality of payment transfer modules 41 that are configured to receive and store payments 502, 504 from the risk exposure components 21, 22, 23 for the pooling of their risks in a payment data store 61. The payments can be stored by transferring and storing component-specific payment parameters. The payment amount can be determined dynamically by means of the resource pooling system 101 based on the total risk of the overall pooled risk exposure components 21, 22, 23. For the pooling of the resources, the system 1 can comprise a monitoring module 8 that requests a periodic payment transfer from the risk exposure components 21, 22, 23, etc. to the resource pooling system 101 by means of the payment transfer module 41, wherein the risk protection for the risk exposure components 21, 22, 23 is interrupted by the monitoring module 8, when the periodic transfer is no longer detectable via the monitoring module 8. In one alternative embodiment, the request for periodic payment transfers is automatically interrupted or waived by the monitoring module 8, when the occurrence of risk event indicators is triggered in the data flow pathway of a risk exposure component 21, 22, 23. Similarly, the first resource pooling system 101 is connected to the second resource pooling system 121 of the second insurance system 12 by means of a second payment transfer module 42 that is configured for receiving and storing payments from the resource pooling system 101 of the first insurance system for the transfer of risks associated with the pooled risk and risk exposures 50, respectively, of the risk exposure components 21, 22, 23 from the first insurance system 10 to the second insurance system 12. The coupling and activating of the two operated insurance systems 10, 12 is achieved by the event-triggered system 1 generating and transmitting appropriate steering signals to the first and second resource pooling systems 101, 121.

As indicated in FIG. 1, the dynamically triggered system 1 includes the first and second data storing module 61, 62 for capturing the risk-related component data and multiple functional-based modules, e.g., the payment transfer modules 41 and 42, the triggers 71, 72, or the aggregation module 5. The functional modules can be implemented at least partly as programmed software modules stored on a computer-readable medium, connected in a fixed or removable manner to the processors of the dynamically triggered system 1 or the associated automated systems 10,12. However, the functional modules may also be fully realized via hardware components, units and/or appropriately implemented modules. As illustrated in FIG. 1, the dynamically triggered system 1 and its components, in particular the first and second resource pooling systems 101, 121, the control device 11, the trigger modules 71,72, the measuring devices 311, 321, 331, 341 with the data transfer interfaces 312, 322, 332, 342, the aggregation module 5, and the payment transfer modules 41, 42, can be connected via a network 91, such as a telecommunications network or any other data transmission network. The network 91 can include a hardwired or wireless network; e.g., the Internet, a GSM (Global System for Mobile Communication) network, a UMTS (Universal Mobile Telecommunications System) network and/or a WLAN (Wireless Local Region Network), and/or dedicated point-to-point communication lines. In any case, the technical electronic money-related setup for the present system comprises adequate technical, organizational and procedural safeguards to prevent, contain and detect threats to the security of the structure, particularly counterfeiting threats. The resource pooling systems 101, 121 furthermore comprise all of the necessary technical means for electronic money transfer and link-up association, e.g., as initiated by one or more associated payment transfer modules 41, 42 via an electronic network. The monetary parameters can be based on any possible electronic and transfer means, such as e-currency, e-money, electronic cash, electronic currency, digital money, digital cash, digital currency, or cyber currency, etc., which can only be exchanged electronically. The first and second payment data stores 61, 62 provide the means for associating and storing monetary parameters associated with a single one of the pooled risk exposure components 21, 22, 23. The present invention can involve the use of the aforementioned networks, such as computer networks or telecommunication networks, and/or the Internet and digital stored value systems. Electronic funds transfer (EFT), direct deposit, digital gold currency and virtual currency are further examples of electronic money modalities. Also, transfers can involve technologies such as financial cryptography and technologies for enabling such transfers. For the transaction of the monetary parameters, it is preferable to use hard electronic currency, without the technical possibilities for disputing or reversing charges. The resource pooling systems 101, 121 for example support non-reversible transactions. The advantage of this arrangement is that the operating costs of the electronic currency system are greatly reduced by not having to resolve payment disputes. However, this way, it is also possible for electronic currency transactions to clear instantly, making the funds available immediately to the systems 10, 12. This means that using hard electronic currency is rather akin to a cash transaction. However, it is also conceivable to use soft electronic currency, such as currency that allows for the reversal of payments, for example having a "clearing time" of 72 hours, or the like. The electronic monetary parameter exchange method applies to all connected systems and modules related to the resource pooling systems 101, 121 of the present invention, such as the first and second payment transfer modules 41, 42. The monetary parameter transfer to the first and second resource pooling system 101, 121 can be initiated by the payment transfer module 41 and 42, respectively, or upon request by the related resource pooling system 101 or 121.

Furthermore, the system 1 can comprise a core engine comprising the risk event triggers for triggering component-specific measuring parameters in the data flow pathway 213, 223, 233 of the assigned risk exposure components 21, 22, 23. The data flow pathway 213, 223, 233 can for example be monitored by the system by means of measuring devices 31, 32, 33, 34 that are connected to a data flow pathway 9 via the interfaces 213, 223, 233; in particular, it can be monitored by the resource pooling systems 101 and/or 121 and/or the control device 11, thereby capturing component-related measuring parameters of the data flow pathway 213, 223, 233 at least periodically and/or within predefined time periods. According to one alternative embodiment, the data flow pathway 213, 223, 233 can for example also be dynamically monitored by the dynamically triggered system 1, such as by triggering component-measuring parameters of the data flow pathway 213, 223, 233 that are transmitted from associated measuring systems 215, 225, 235. By triggering the data flow pathway 213, 223, 233, which comprises dynamically recorded measuring parameters of the concerned risk exposure components 21, 22, 23, the system 1 is able to detect the occurrence of predefined risk events based on predefined trigger parameters. Furthermore, the system 1 can for example also dynamically monitor different stages during the progress of the impact of a risk event on the risk exposure component 21, 22, 23 in order to provide appropriately adapted and gradated risk protection for a specific risk exposure component 21, 22, 23. Such a risk protection structure is based on received and stored payments 214, 224, 234 from the related risk exposure component 21, 22, 23 and/or related to the total risk exposure 50 of the resource pooling system 101, based on the overall transferred risks of all pooled risk exposure components 21, 22, 23.

The risk exposure components 21, 22, 23 of the dynamically triggered insurance system 1 are connected to the first insurance system 10 of the system 1 by transferring risk exposure 50 associated with the occurrence of defined risk events 501 from the risk exposure components 21, 22, 23 to the first insurance system 10 by means of equitable, mutually aligned first risk transfer parameters 501 and correlated aligned first payment transfer parameters 502. The mutual alignment can be achieved by electronically negotiating and mutually adapting the parameters 501/502 over the network 91 via appropriately implemented interface modules of the first insurance system 10 and on the other side of the risk exposure components 21, 22, 23 based on dedicated optimization algorithms and means. For the further risk transfer, similarly, the first insurance system 10 is connected to the second insurance system 12 of the convertibly triggered system 1 by at least partially further transferring risk exposure 50 associated with the occurrence of the defined risk events 511, 512, 513 from the first insurance system 10 to the second insurance system 12 through equitable, mutually aligned second risk transfer parameters 503 and correlated aligned second payment transfer parameters 504. Again, the mutual alignment can be achieved by electronically negotiating and mutually adapting the parameters 503/504 over the network 91 by means of appropriately implemented interface modules of the first insurance system 10 on the one hand and the second insurance system 12 on the other hand, based on dedicated optimization algorithms and means/modules. If one of the defined risk event 511, 512, 513 occurs, loss parameters measuring the loss at the risk exposure components 21, 22, 23 are captured from the data flow pathway 9 of the measuring devices 215, 225, 235 and transmitted to the first insurance system 10, wherein the loss having occurred is automatically covered by the first insurance system 10 based on the equitable, mutually aligned second risk transfer parameters 503.

Furthermore, the system 1 comprises event-driven triggers for triggering measuring parameters in a data flow pathway 213, 223, 233 of measuring devices 31, 32, 33, 34 associated with the risk exposure components 21, 22, 23 when a risk event occurs. The data flow pathways 213, 223, 233 can be connected to an overall data flow pathway 9 and/or to the network 91, as described above. The measuring devices 31, 32, 33, 34 comprise the interfaces 213, 223, 233 for allowing data access to measuring 312, 322, 332, 342. If an occurrence of a risk event is triggered in the data flow pathway 9, the corresponding activation signal is generated by the system 1 based on the measured actual loss, wherein the system 1 triggers the activation of the first and second resource pooling systems 10, 12 via the generated activation signal by transferring the activation to the first and/or second resource pooling system 101, 121 in order to provide risk protection to the risk exposure components 21, 22, 23. In this way, the present invention provides the utmost flexibility and an optimal technical solution for coupled and automated insurance systems 10, 12 with associated resource pooling systems 101, 121.

In addition to the adaptation of the triggers 31, 32, 33, the quantity of payments requested from the risk exposure components 21, 22, 23 can be adjusted accordingly by the system 1 and/or the resource pooling system 101 to ensure long-term operation. Therefore, the receipt and preconditioned storage 61 of payments 214, 224, 234 from risk exposure components 21, 22, 23 for the pooling of their risks can be determined dynamically, based on total risk 50 and/or the likelihood of the risk exposure of the pooled risk exposure components 21, 22, 23 to improve the operational and functional security of the system 1 even further. The number of pooled risk exposure components 21, 22, 23 can be dynamically adapted by means of the system 1 and/or the resource pooling system 10 to a range where non-covariant occurring risks that are covered by the resource pooling system 1 affect only a relatively small proportion of the total pooled risk exposure components 21, 22, 23 at any given time. In another alternative, the pooled risk transfers from first resource pooling systems 10 can also be dynamically adaptable by means of the second resource pooling system 12 to a range where non-covariant occurring risks covered by the second resource pooling system 12 affect only a relatively small proportion of the total pooled risk transfers from first resource pooling systems 10 at any given time. The triggering parameters of the covered risk events can be contained and stored in a predefined searchable table, such as an appropriately structured hash table, of predefined risk events, respectively risk event parameters. The corresponding losses occur as a result of a risk event at risk exposure components 21, 22, 23, . . . with regard to one of the searchable risk events; i.e., the possible need of risk exposure components 21, 22, 23, . . . to be covered by the pooled resources of the resource pooling systems 10,12 is linked to the risk of the occurrence of a risk event that requires resolving the loss in order to avoid operational interruption, or the like.

Finally, in a further specified alternative embodiment, an independent verification risk event trigger of the system 1 can be activated in the event the occurrence of indicators for one of the predefined risk events or level of excess of loss is triggered in the data flow pathway 213, 223, 233 of a risk exposure component 21, 22, 23, etc. by means of the risk event trigger 31, 32, and wherein the independent verification risk event trigger, additionally, is triggered with regard to the occurrence indicators for one of the predefined risk events in an alternative data flow pathway 215, 225, 235 with independent measuring parameters from the primary data flow pathway 213, 223, 233 in order to verify the occurrence of the risk event at the risk exposure component 21, 22, 23, etc. As an alternative, the parametric or otherwise predefined transfer of payments is only assigned to the corresponding trigger-flag when the occurrence of the risk event at the risk exposure component 21, 22, 23, etc. has been verified by the independent verification risk event trigger.

LIST OF REFERENCE SIGNS

1 Dynamically triggered, multi-tier risk-transfer system
10 First insurance system
101 Automated resource pooling system of first insurance system
11 Control device
12 Second resource pooling system/second insurance system
121 Automated resource pooling system of the second insurance system
21, 22, 23, 24 Risk exposure component
211, 221, 231 Risk-related component data
212, 222, 232 Likelihood of risk exposure of the pooled risk exposure components
213, 223, 233 Interface to data flow pathway
215, 225, 235 Measuring devices
31, 32, 33, 34 Measuring and detection devices
311, 321, 331, 341 Measurable defined risk events
312, 322, 332, 342 Data transmission interfaces
41 First payment transfer module
42 Second payment transfer module
5 Aggregation module
50 Risk exposure
501 First risk transfer parameters
502 First payment transfer parameters
503 Second risk transfer parameters
504 Second payment transfer parameters
51 Captured loss parameters of measured occurrence of risk events
511 Parameters measuring the occurrence of property risks
512 Parameters measuring the occurrence of casualty risks
513 Parameters measuring the occurrence of natural calamity risks
52 Aggregated loss parameter
53 Aggregated payment parameter
54 Variable loss ratio parameter
61 First payment data store
610, 611, 612 Stored first payment parameters
62 Second payment data store
620, 621, 622 Stored second payment parameters
7 Trigger system
71 First trigger module
711 Alterable loss ratio threshold value
712 Deviation of the alterable loss ratio threshold value for one time period to the subsequent time period
713 Time period
714 Time period preceding time period 713
72 Second trigger module
721 Floating activation threshold value
722 Settable minimum activation trigger
8 Monitoring module
9 Data flow pathway of measuring devices
91 Network

The invention claimed is:
1. A dynamically triggered, multi-tier risk-transfer system based on an automatically steered, floating recoverable basis, the dynamically triggered, multi-tier risk-transfer system comprising:
  circuitry configured to
    trigger, signal, and mutually activate a coupled first and second insurance system providing a self-sufficient risk protection fir a variable number of defined risk exposure components by a first and second resource pooling system;
    implement interfaces comprising a plurality of payment transfer modules to connect to the risk exposure components, the plurality of payment transfer modules configured to receive and store first payments from the risk exposure components for pooling of their risk exposures, wherein the first insurance system provides automated risk protection for each of the connected risk exposure components based on received and stored first payment parameters;
    implement second payment transfer modules to connect the first insurance system to the second resource pooling system, the second payment transfer modules being configured to receive and store second payment parameters from the first insurance system for adopting of a portion of the risk exposures accumulated by the first insurance system, wherein, in case of an occurrence of one of the defined risk events, loss is automatically covered by the first insurance system;

implement a trigger system that comprises a first trigger module triggering a variable loss ratio parameter by an alterable loss ratio threshold value, wherein the trigger system comprises an aggregation module for automatically aggregating captured loss parameters of a measured occurrence of risk events over all risk exposure components within a predefined time period by incrementing an associated stored aggregated loss parameter and for automatically aggregating the received and stored first payment parameters over all risk exposure components within the predefined time period by incrementing an associated stored, aggregated payment parameter, and wherein the variable loss ratio parameter is generated dynamically based on a ratio of the aggregated loss parameter and the aggregated payment parameter;

by triggering the variable loss ratio parameter exceeding said loss ratio threshold value, activate a second trigger module of the trigger system, dynamically set a floating activation value to a value of the variable loss ratio parameter and/or subject to the aggregated loss parameter, and trigger the floating activation value by an adjustable minimum activation threshold trigger, and if said floating activation value exceeding the minimum activation threshold trigger is triggered, automatically activate the second insurance system by transferring activation signaling to the second insurance system covering, upon activation, said adopted portion of the risk exposures accumulated by the first insurance system.

2. The dynamically triggered, multi-tier risk-transfer system according to claim 1, wherein the circuitry is configured to operate on a multi-operation period basis, wherein an operation period is set to said predefined time period, wherein said adjustable minimum activation threshold trigger is set to the value of the variable activation threshold value of a first time period, and wherein the second insurance system is only activated if the floating activation value is triggered above the adjustable minimum activation threshold trigger.

3. The dynamically triggered, multi-tier risk-transfer system according to claim 1, wherein the circuitry is configured to offset the minimum activation threshold trigger for a first operation period.

4. The dynamically triggered, multi-tier risk-transfer system according to claim 1, wherein the circuitry is configured such that the self-sufficient risk protection for the variable number of defined risk exposure components comprises a plurality of different risk contribution portions to a total risk exposure, wherein the different risk contribution portions comprise at least defined portions of property risks and/or casualty risks and/or natural calamity risks.

5. The dynamically triggered, multi-tier risk-transfer system according to claim 4, wherein the circuitry is configured to set the minimum activation threshold trigger according to a floating activation value of a time period without a measured occurrence of a natural calamity risk event.

6. The dynamically triggered, multi-tier risk-transfer system according to claim 1, wherein the circuitry is configured to connect the risk exposure components to the first insurance system transferring risk exposure associated with occurrence of defined risk events from the risk exposure components to the first insurance system by equitable, mutually aligned first risk transfer parameters and correlated aligned first payment transfer parameters;

connect the first insurance system to a second insurance system by transferring risk exposure associated with the occurrence of the defined risk events from the first insurance system to the second insurance system by equitable, mutually aligned second risk transfer parameters and correlated aligned second payment transfer parameters; and in case of the occurrence of one of the defined risk events, capture loss parameters measuring the loss at the risk exposure components and transmit the loss parameters to the first insurance system, and automatically cover the loss by the first insurance system based on the equitable, mutually aligned first risk transfer parameters.

7. The dynamically triggered, multi-tier risk-transfer system according to claim 6, wherein the circuitry is configured to, in case of the occurrence of one of the defined risk events, capture loss parameters measuring the loss at the risk exposure components and transmit the loss parameters to the first insurance system, and automatically cover the loss by the first insurance system.

8. The dynamically triggered, multi-tier risk-transfer system according, to claim 6, wherein the circuitry is configured such that the defined risk events comprise at least parameters measuring an occurrence of property risks and/or parameters measuring an occurrence of casualty risks and/or parameters measuring an occurrence of natural calamity risks.

9. The dynamically triggered, multi-tier risk-transfer system according to claim 1, wherein the circuitry is configured such that the first and second trigger modules are triggering on measuring values captured at the end of a time period.

10. The dynamically triggered, multi-tier risk-transfer system according to claim 9, wherein the circuitry is configured to set said predefined time period and associated operation period to a financial year, and wherein the circuitry is configured such that the first and second trigger modules are triggering on values of the end of the time period.

11. The dynamically triggered, multi-tier risk-transfer system according to claim 1, wherein the aggregation module of the trigger system automatically captures and automatically aggregates measured loss parameters over all risk exposure components via appropriate interface modules and an appropriate data transmission network.

12. The dynamically triggered, multi-tier risk-transfer system according to claim 1, wherein the payment transfer modules are configured for receiving and storing first payment parameters from the risk exposure components for transfer of risks associated with the risk exposure components from the risk exposure components to the first insurance system.

13. The dynamically triggered, multi-tier risk-transfer system according to claim 1, wherein the circuitry is configured to connect the first insurance system to the second insurance system by a payment transfer module configured for receiving and storing second payment parameters from the first insurance system for transfer of risks associated with pooled risk exposures of the risk exposure components from the first insurance system to the second insurance system.

14. The dynamically triggered, multi-tier risk-transfer system according to claim 1, wherein the circuitry is configured to capture a payment transfer from the first insurance system to the second payment transfer module, wherein the second insurance system is only activatable by triggering a payment transfer matching a predefined activation control parameter.

15. The dynamically triggered, multi-tier risk-transfer system according to claim 1, wherein a loss associated with the risk event and allocated to a pooled risk exposure component is covered by automated resource pooling systems of the first insurance system via a transfer of payments from the first resource pooling system to said risk exposure component, and wherein a second payment transfer from an automated second resource pooling system of the second insurance system to the first resource pooling system is triggered via a generated activation signal based on a measured actual loss of the risk exposure component.

16. The dynamically triggered, multi-tier risk-transfer system according to claim 15, wherein the loss corresponding to the risk that is transferred to the second resource pooling system is directly covered by the second resource pooling system through the transfer of resources from the second resource pooling system to concerned risk exposure components via the second payment transfer module.

17. The dynamically triggered, multi-tier risk-transfer system according to claim 1, wherein said aggregation module is configured to process risk-related component data and to provide a likelihood of the risk exposure for one or a plurality of the pooled risk exposure components based on risk-related component data, and wherein receipt and preconditioned storage of payments from risk exposure components for the pooling of their risks are determined dynamically based on total risk and/or the likelihood of the risk exposure of the pooled risk exposure components.

18. The dynamically triggered, multi-tier risk-transfer system according to claim wherein the circuitry is configured to implement a second aggregation module for processing risk-related component data and for providing a likelihood of said risk exposure for one or a plurality of the pooled risk exposure components based on risk-related component data, and wherein receipt and preconditioned storage of payments from first resource pooling system to the second resource pooling system for transfer of its risk is determined dynamically based on total risk and/or the likelihood of the risk exposure of the pooled risk exposure components.

19. The dynamically triggered, multi-tier risk-transfer system according to claim 1, wherein the number of pooled risk exposure components is adapted dynamically via the first insurance system to a range to control a proportion of total pooled risk exposure components affected by non-covariant occurring risks covered by the first insurance system at any given time.

20. The dynamically triggered, multi-tier risk-transfer system according to claim 1, wherein a pooled risk transfer from the first resource pooling system is adapted dynamically via the second insurance system to a range to control a proportion of total pooled risk exposure components affected by non-covariant occurring risks covered by the second insurance system at any given time.

21. The dynamically triggered, multi-tier risk-transfer system according to claim 1, wherein the circuitry is configured to dynamically adapt the first trigger module and/or second trigger module via an operating module based on time-correlated incidence data for one or a plurality of risk events.

22. The dynamically triggered, multi-tier risk-transfer system according to claim 1, wherein, upon each triggering of an occurrence of measuring parameters indicating a risk event via one of the trigger modules, a total parametric payment is allocated with the triggering, wherein a total allocated payment is transferrable, when the occurrence has been triggered, to a corresponding pooled risk exposure component affected by an occurrence of the measured occurrence of said risk event.

23. A dynamically triggered, multi-tier risk-transfer method based on an automatically steered, floating recoverable basis, the dynamically triggered, multi-tier risk-transfer method comprising:

triggering, signaling, and mutually activating, using circuitry, a coupled first and second insurance system providing a self-sufficient risk protection for a variable number of defined risk exposure components by a first and second resource pooling system;

implementing, using the circuitry, interfaces comprising a plurality of payment transfer modules to connect to the risk exposure components, the plurality of payment transfer modules configured to receive and store first payments from the risk exposure components for pooling of their risk exposures, wherein the first insurance system provides automated risk protection for each of the connected risk exposure components based on received and stored first payment parameters;

implementing, using the circuitry, second payment transfer modules to connect the first insurance system to the second resource pooling system, the second payment transfer modules being configured to receive and store second payment parameters from the first insurance system for adopting of a portion of the risk exposures accumulated by the first insurance system, wherein, in case of an occurrence of one of defined risk events, a loss is automatically covered by the first insurance system;

implementing, using the circuitry, a trigger system that comprises a first trigger module triggering a variable loss ratio parameter by an alterable loss ratio threshold value, wherein the trigger system comprises an aggregation module for automatically aggregating captured loss parameters of a measured occurrence of risk events over all risk exposure components within a predefined time period by incrementing an associated stored aggregated loss parameter and for automatically aggregating the received and stored first payment parameters over all risk exposure components within the predefined time period by incrementing air associated stored, aggregated payment parameter, and wherein the variable loss ratio parameter is generated dynamically based on a ratio of the aggregated loss parameter and the aggregated payment parameter;

by triggering the variable loss ratio parameter exceeding said loss ratio threshold value, activate a second trigger module of the trigger system, dynamically setting, using the circuitry, a floating activation value to a value of the variable loss ratio parameter and/or subject to the aggregated loss parameter, and triggering the floating activation value by an adjustable minim m activation threshold trigger, and if said floating activation value exceeding a minimum activation threshold trigger is triggered, automatically activating, using the circuitry, the second insurance system by transferring activation signaling to the second insurance system covering, upon activation, said adopted portion of risk exposures accumulated by the first insurance system.

24. The dynamically triggered, multi-tier risk-transfer method according to claim 23, wherein the method operates on a multi-operation period basis, wherein an operation period is set to said predefined time period, wherein said adjustable minimum activation threshold trigger is set to a value of a variable activation threshold value of a first time period, and wherein the second insurance system is only activated by the system if the floating activation value is triggered above an adjustable minimum activation threshold trigger.

25. The dynamically triggered, multi-tier risk-transfer method according to claim 23, further comprising offsetting the minimum activation threshold trigger for a first operation period.

26. The dynamically triggered, multi-tier risk-transfer method according to claim 23, wherein the self-sufficient risk protection for the variable number of defined risk exposure components comprises a plurality of different risk contribution portions to a total risk exposure, wherein the different risk contribution portions comprise at least defined portions of property risks and/or casualty risks and/or natural calamity risks.

27. The dynamically triggered, multi-tier risk-transfer method according to claim 26, further comprising setting a minimum activation threshold trigger according to a floating activation value of a time period without a measured occurrence of a natural calamity risk event.

28. The dynamically triggered, multi-tier risk-transfer method according to claim 23, further comprising:
 connecting the risk exposure components to the first insurance system transferring risk exposure associated with the occurrence of defined risk events from the risk exposure components to the first insurance system by equitable, mutually aligned first risk transfer parameters and correlated aligned fast payment transfer parameters;
 connecting the first insurance system to a second insurance system by transferring risk exposure associated with the occurrence of the defined risk events from the first insurance system to the second insurance system by equitable, mutually aligned second risk transfer parameters and correlated aligned second payment transfer parameters; and
 in case of the occurrence of one of the defined risk events, capturing loss parameters measuring the loss at the risk exposure components and transmitting the loss parameters to the first insurance system, and automatically covering the loss by the first insurance system based on the equitable, mutually aligned first risk transfer parameters.

29. The dynamically triggered, multi-tier risk-transfer method according to claim 28, further comprising, in case of the occurrence of one of the defined risk events, capturing loss parameters measuring the loss at the risk exposure components and transmitting the loss parameters to the first insurance system, and automatically covering the loss by the first insurance system.

30. The dynamically triggered, multi-tier risk-transfer method according to claim 28, wherein the defined risk events comprise at least parameters measuring an occurrence of property risks and/or parameters measuring an occurrence of casualty risks and/or parameters measuring an occurrence of natural calamity risks.

31. The dynamically triggered, multi-tier risk-transfer method according to claim 23, wherein the first and second trigger modules are triggering on measuring values captured at the end of a time period.

32. The dynamically triggered, multi-tier risk-transfer method according to claim 31, further comprising setting said predefined time period and associated operation period to a financial year, wherein the first and second trigger modules are triggering on values of the end of the time period.

33. The dynamically triggered, multi-tier risk-transfer method according to claim 23, wherein the aggregation module of the trigger system automatically captures and automatically aggregates measured loss parameters over all risk exposure components via appropriate interface modules and an appropriate data transmission network.

34. The dynamically triggered, multi-tier risk-transfer method according to claim 23, wherein the payment transfer modules are configured for receiving and storing first payment parameters from the risk exposure components for transfer of risks associated with the risk exposure components from the risk exposure components to the first insurance system.

35. The dynamically triggered, multi-tier risk-transfer method according to claim 23, wherein the first insurance system is connected to the second insurance system by a payment transfer module configured for receiving and storing second payment parameters from the first insurance system for transfer of risks associated with pooled risk exposures of the risk exposure components from the first insurance system to the second insurance system.

36. The dynamically triggered, multi-tier risk-transfer method according to claim 23, further comprising capturing a payment transfer from the first insurance system to the second payment transfer module, wherein the second insurance system is only activatable by triggering a payment transfer matching a predefined activation control parameter.

37. The dynamically triggered, multi-tier risk-transfer method according to claim 23, wherein a loss associated with the risk event and allocated to a pooled risk exposure component is covered by automated resource pooling systems of the first insurance system via a transfer of payments from the first resource pooling system to said risk exposure component, and wherein a second payment transfer from an automated second resource pooling system of the second insurance system to the first resource pooling system is triggered via a generated activation signal based on the measured actual loss of the risk exposure component.

38. The dynamically triggered, multi-tier risk-transfer method according to claim 37, wherein the loss corresponding to the risk that is transferred to the second resource pooling system is directly covered by the second resource pooling system through transfer of resources from the second resource pooling system to concerned risk exposure components via the second payment transfer module.

39. The dynamically triggered, multi-tier risk-transfer method according to claim 23, wherein said aggregation module is configured to process risk-related component data and to provide a likelihood of the risk exposure for one or a plurality of the pooled risk exposure components based on risk-related component data, and wherein receipt and preconditioned storage of payments from risk exposure components for pooling of their risks are determined dynamically based on total risk and/or the likelihood of the risk exposure of the pooled risk exposure components.

40. The dynamically triggered, multi-tier risk-transfer method according to claim 23, further comprising:

implementing a second aggregation module for processing risk-related component data and for providing a likelihood of said risk exposure for one or a plurality of the pooled risk exposure components based on risk-related component data; and determining receipt and preconditioned storage of payments from first resource pooling system to the second resource pooling system for transfer of its risk dynamically based on total risk and/or the likelihood of the risk exposure of the pooled risk exposure components.

41. The dynamically triggered, multi-tier risk-transfer method according to claim 23, further comprising adapting a number of pooled risk exposure components dynamically via the first insurance system to a range to control a proportion of total pooled risk exposure components affected by non-covariant occurring risks covered by the first insurance system at any given time.

42. The dynamically triggered, multi-tier risk-transfer method according to claim 23, further comprising adapting a pooled risk transfer from the first resource pooling system dynamically via the second insurance system to a range to control a proportion of total pooled risk exposure components affected by non-covariant occurring risks covered by the second insurance system at any given time.

43. The dynamically triggered, multi-tier risk-transfer method according to claim 23, further comprising dynamically adapting the first trigger module and/or second trigger module via an operating module based on time-correlated incidence data for one or a plurality of risk events.

44. The dynamically triggered, multi-tier risk-transfer method according to claim 23, further comprising, upon each triggering of an occurrence of measuring parameters indicating a risk event via one of the trigger modules, allocating a total parametric payment with the triggering, wherein a total allocated payment is transferrable, when the occurrence has been triggered, to a corresponding pooled risk exposure component affected by an occurrence of the measured occurrence of said risk event.

* * * * *